Feb. 12, 1929.
C. E. STOLL
1,701,643
WEEDLESS ARTIFICIAL BAIT
Filed Sept. 2, 1927
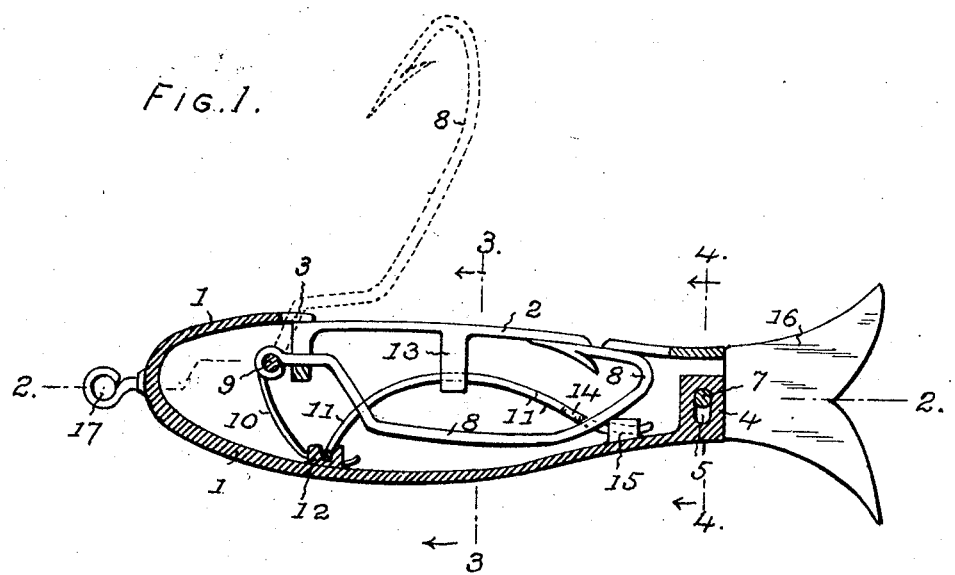
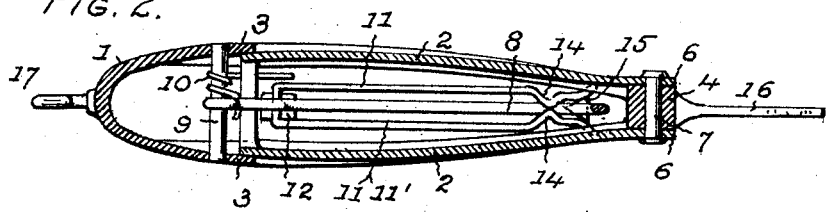
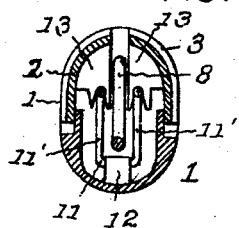 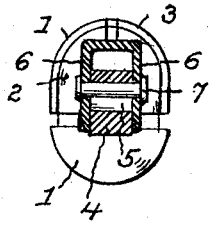
INVENTOR:
CHARLES E. STOLL,
BY Robert Burns
ATT'Y.

Patented Feb. 12, 1929.

1,701,643

UNITED STATES PATENT OFFICE.

CHARLES E. STOLL, OF CHICAGO, ILLINOIS.

WEEDLESS ARTIFICIAL BAIT.

Application filed September 2, 1927. Serial No. 217,084.

This invention relates to fishing hooks of the weedless trolling and casting type in which the barbed hook member is housed within the hollow of an artificial bait body and is adapted to be released from an engaged condition therein as the fish closes its jaws upon the bait, and so that the barbed portion may engage in the mouth of the fish. The present improvement has for its objects:—

To provide a structural formation and combination of parts, wherein a barbed hook is pivoted in the interior of an artificial bait or lure, with a resilient tendency to move out of the same into an unmasked condition, but which is normally held in a masked condition by latching means which in turn is adapted to be moved to a release as the jaws of a fish close upon the artificial bait or lure.

To provide a simple and effective construction of latching spring and accessories whereby an effective holding engagement is had with the shank portion of a barbed fish hook and wherein the operation of the spring to a release is attained, regardless of whether the fish bites the forward, middle or rearward portion of the bait or lure, all as will hereinafter more fully appear.

In the accompanying drawing:—

Fig. 1, is a central longitudinal section of an artificial bait or lure, embodying the preferred form of the invention.

Fig. 2, is a horizontal section on line 2—2 Fig. 1.

Fig. 3, is a transverse section on line 3—3 Fig. 1.

Fig. 4, is a similar section on line 4—4 Fig. 1.

Like reference numerals indicate like parts in the different views.

In this invention the artificial bait or lure is of a hollow shape having any usual or ordinary configuration, and formed of any usual and suitable material. In the preferred form of the invention said bait or lure comprises a main longitudinal portion 1, and a supplementary longitudinal portion 2, with said portions attached together in a manner permitting of the portions moving to and from each other, while held from either longitudinal or lateral movement. The preferred manner of effecting such attachment is as follows:

The main bait portion 1, is formed with a hooded part 3, near its forward end, and at its rearward end with an end wall or flange 4, provided with an elongated slot 5. Complementary to such construction the supplementary bait portion 2, has a curved form at its forward end adapted for engagement inside the hooded part 3 of the portion 1 aforesaid, so that the movement of the forward end of the portion 2, away from the main portion is confined to the proper limit. At its rear end the supplementary portion 2 is formed with depending side ears or flanges 6 adapted to straddle the rear wall or flange 4 of the main bait portion 1, with said ears or flanges 6 carrying a cross pin 7 having limited movement in the slot 5 of the wall or flange 4, and thus limit the amount of independent movement between the portions 1 and 2 at the rear end of the same.

The barbed fish hook 8 of the present construction is pivoted at one end by a cross pin or shaft 9 within the main portion 1 and near the forward end of the same, and with a normal tendency of the fish hook to move out of the interior of the bait or lure and through a longitudinal passage formed therefor in the portions 1 and 2 of the bait, with such tendency attained by a spring 10 operatively connected to the hook 8 and carrying shaft 9, as shown.

A spring 11 of an arcuate shape has intermediate association with the fish hook 8 and body portions 1 and 2 of the bait or lure, and in the construction shown the forward end of the spring 11 has pivotal bearing in a saddle piece 12 in the forward portion of the main bait portion 1, while the rearward end of said spring has sliding bearing upon the inner surface of said bait portion 1, under the influence of an inward stress upon the crown or middle portion of the spring with such stress set up by a bearing lug 13 on the supplemental bait portion 2, as said portion is moved towards the main portion 1 in a closing movement of the jaws of a fish upon the bait or lure, with a resulting compression and elongation of the spring 11 rearwardly and in the direction of its length.

In the present structure the arcuate spring 11 is preferably formed of a length of spring wire bent upon itself to provide a pair of counterpart members 11' in parallel relation, with the forwardly arranged and transverse connecting member of said pair of members 11' adapted for pivotal engagement in the saddle piece 12, aforesaid. The rear and unconnected ends of the pair of members 11' are formed with V shaped humps 14 in opposed relation and with the apices of said humps adapted to be held in contact by the normal resiliency of the members 11'.

With the above described construction of parts, on the barbed rearward portion of the fish hook 8 being pressed by hand into the interior of the body of the bait or lure, the adjacent shank portion of the hook will act against the V shaped humps 14 to force the same apart and with a further inward movement of such shank portion of the fish hook, the humps 14 will return into contact with each other and above such shank portion of the fish hook and maintain the same in its retracted or masked condition, as illustrated in full lines in Fig. 1.

The parallel members 11' to the rear of the humps 14 are inclined outwardly and have bearing on the opposite faces of a triangular lug 15 fixed in the interior of the main portion 1 of the bait or lure, so that in a longitudinal and rearward extension of the arcuate spring 11 as above described, the spring members 11' and the humps 14 will be moved apart to release the holding engagement of the humps 14 on the shank of the fish hook 8, to permit the barbed portion thereof to move out of the cavity of the bait or lure into its unmasked position illustrated in dotted lines in Fig. 1.

In the construction shown in the drawings the bearing lug 13, is arranged transversely with its central portion removed to provide a portion of the heretofore described passageway for the fish hook 8, and each of the side portions of the lug then formed is cut away to form receiving and positioning recesses for the pair of members 11' of the arcuate spring 11, aforesaid.

At its rear end the body of the bait or lure will usually be provided with a flexible tail 16 or other ordinary appendage, and at its forward end will have an attaching eye 17 for the fishing line or cord.

The operation of the appliance is as follows:

With the parts in the set position shown in Fig. 1, the pivoted fish hook 8, is held in a masked position in the interior of the hollow body of the bait by a holding engagement of the humps 14, of the members 11' of the arcuate spring 11, with the shank portion of said fish hook. Such relation prevails in the passage of the bait through the water as a lure for a fish, and as a lured fish closes its jaws upon the bait body, the longitudinal portions 1 and 2, thereof are moved together with results as follows: The lug 13, in such movement imparts a straightening movement to the arcuate spring 11, to effect a corresponding rearward movement of the rear and free end of such spring, and in such rearward movement of the ends of the spring, such rear ends will ride upon the triangular lug 15, to cause a separation of the humps 14, and a release of the holding engagement of the humps upon the shank of the fish hook 8, which, under the influence of the spring 10, is projected out of the bait body into hooking engagement in the mouth of the fish.

Having thus fully described my invention what I claim and desire to secure by Letters Patent, is:—

1. In an artificial bait, the combination of a hollow body comprising a pair of longitudinal portions connected together to have limited movement to and from each other, a fish hook pivoted within the forward end of one of the aforesaid portions and having movement through a passage in the other of said portions, a spring acting to move said hook outwardly, an arcuate spring member having pivotal support at one end and sliding support at the other end within one of said body portions, a lug on the other one of said body portions having bearing upon said arcuate spring at its mid-length, the arcuate spring having a spaced formation at its sliding end and formed with opposed humps for engaging and holding the shank of the fish hook aforesaid, and a fixed triangular lug arranged in the path of the spaced formation of the arcuate spring so as to effect a separation of the aforesaid humps and a release of the fish hook in a straightening movement of the arcuate spring.

2. In an artificial bait, the combination of a hollow body comprising two longitudinal portions connected together to have limited movement to and from each other by an interengaging hooded formation of the portions at one end and a pin and elongated slot formation at the other end, a fish hook pivoted within the forward end of one of said portions and having movement through a passage in the other of said portions, a spring acting to move said hook outwardly, an arcuate spring member having pivotal support at one end and sliding support at the other end within one of said body portions, a lug on the other one of said body portions having bearing upon said arcuate spring at its midlength, the arcuate spring having a spaced formation at its sliding end and formed with opposed humps for engaging and holding the shank of the fish hook aforesaid, and a fixed triangular lug arranged in the path of the spaced formation of the arcuate spring so as to effect a separating of the aforesaid humps, and a release of the fish hook in a straightening movement of the arcuate spring.

3. In an artificial bait, the combination of a hollow body comprising two longitudinal portions connected together to have limited movement to and from each other, a fish hook pivoted within the forward end of one of said portions and having movement through a passage in the other of said portions, a spring acting to move said hook outwardly, an arcuate spring member consisting of a pair of parallel members having pivotal support at one end and sliding support at the other end within one of said body portions, a lug on the other one of said body portions having bearing upon said arcuate spring at its midlength, the parallel members of the arcuate spring being formed with opposed humps near their sliding ends for engaging and holding the shank portion of the aforesaid fish hook, and a fixed triangular lug arranged in the path of the sliding ends of said parallel members to effect a separation of the aforesaid humps and a release of the fish hook in a straightening movement of the arcuate spring.

4. In an artificial bait, the combination of a hollow body comprising two longitudinal portions connected together to have limited movement to and from each other, a fish hook pivoted within the forward end of one of said portions and having movement through a passage in the other of said portions, a spring acting to move said hook outwardly, an arcuate spring member consisting of a pair of parallel members having pivotal support at one end and a sliding support at the other end within one of said body portions, a lug on the other one of said body portions, formed with channels to receive and provide bearings for the midlength portion of the parallel members of the arcuate spring, said parallel members being formed with opposed humps near their sliding ends for engaging and holding the shank portion of the aforesaid fish hook, and a fixed triangular lug arranged in the path of the sliding ends of said parallel members to effect a separation of the aforesaid humps and a release of the fish hook in a straightening movement of the arcuate spring.

In testimony whereof I hereunto affix my signature.

CHARLES E. STOLL.